Oct. 25, 1949.　　　　　A. GAZDA　　　　　2,486,272
HELICOPTER WITH ANTITORQUE REACTION JET
Filed Dec. 14, 1943　　　　　　　　　　　3 Sheets-Sheet 1
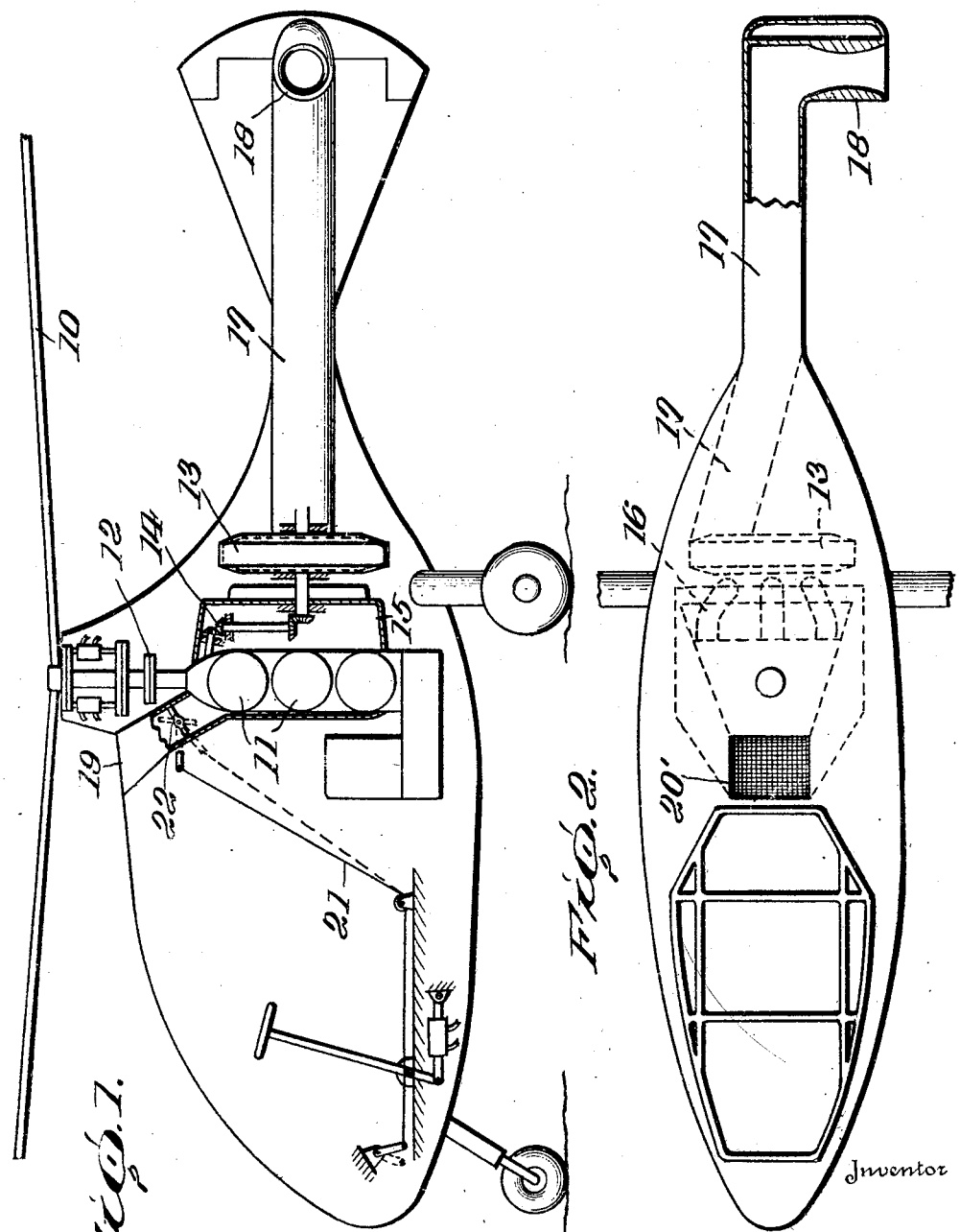
Inventor
ANTOINE GAZDA
By
Attorney Oct. 25, 1949.  A. GAZDA  2,486,272
HELICOPTER WITH ANTITORQUE REACTION JET
Filed Dec. 14, 1943  3 Sheets-Sheet 2
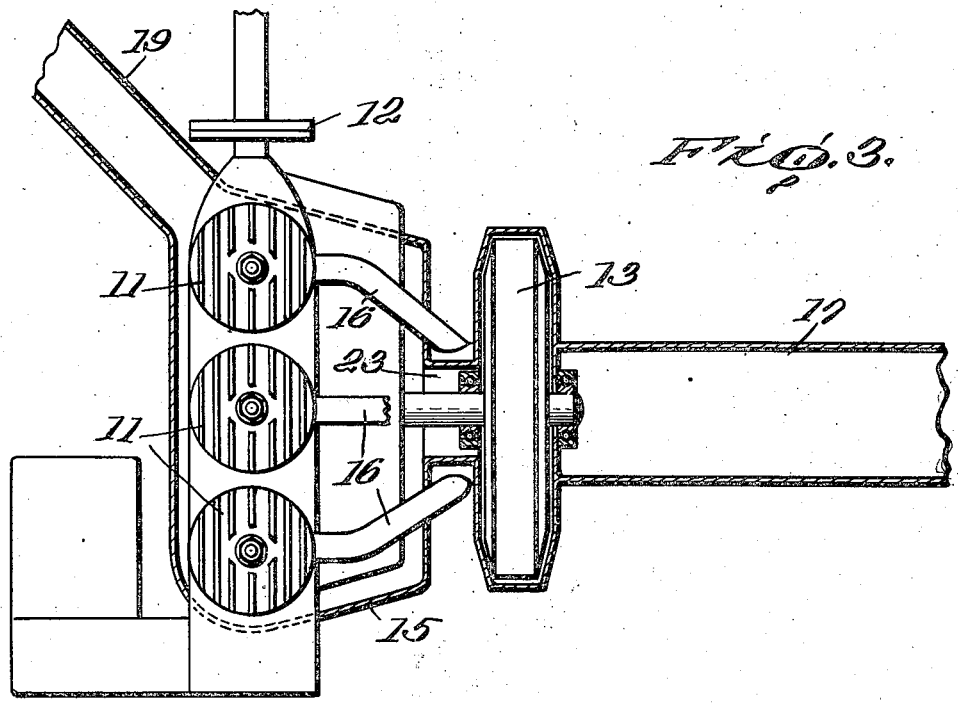
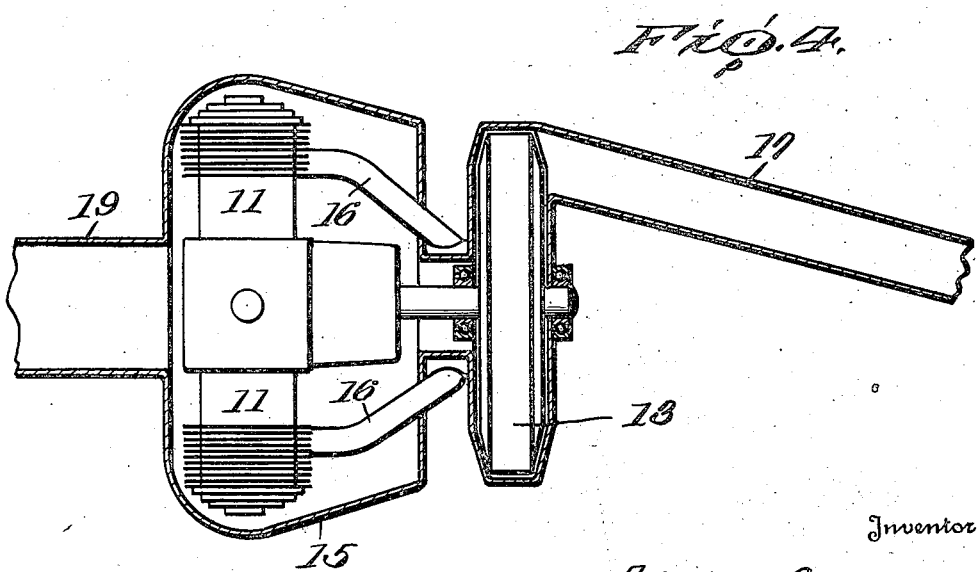
Inventor
ANTOINE GAZDA
By  E. F. Wendroth
Attorney

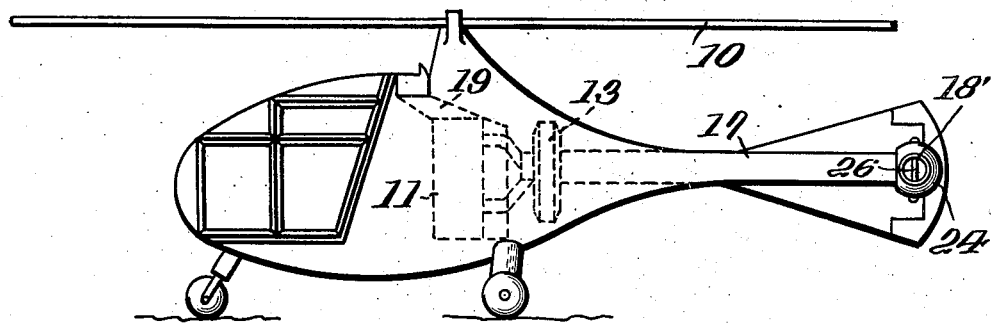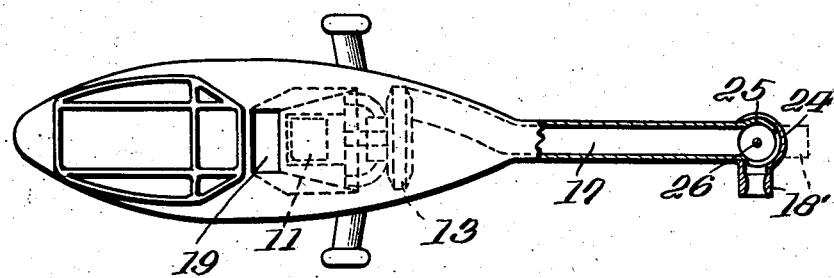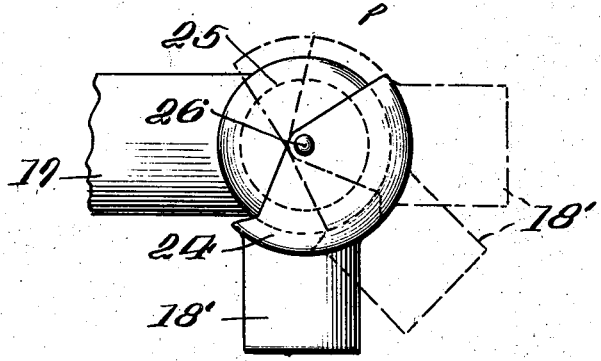

Patented Oct. 25, 1949

2,486,272

UNITED STATES PATENT OFFICE 2,486,272

HELICOPTER WITH ANTITORQUE REACTION JET

Antoine Gazda, Providence, R. I.

Application December 14, 1943, Serial No. 514,265

1 Claim. (Cl. 244—17.19)

The present invention relates to new and useful improvements in helicopters. In my prior and copending patent application, Serial No. 492,266, filed June 25, 1943, now abandoned, there is disclosed an aircraft of the "Helicospeeder" type, a construction capable of rapid forward flight in addition to ascending and descending movement, due to the provision of a pusher propeller in addition to the usual helicopter lifting blades. This pusher propeller is also capable of acting as antitorque means during hovering flight, to counteract the torque effect of the lifting blades.

A primary purpose of the present invention is to provide a helicopter aircraft with pusher propulsion means for rapid forward flight.

Additional objects of, as well as advantages and capabilities inherent in, the invention will appear from the detailed description of presently preferred embodiments thereof hereinafter set forth.

Briefly and broadly stated, the objects and advantages of the invention are realized by the provision of means, preferably at the back or tail end of the craft, for exerting a reaction force thereagainst by the expulsion therefrom of gases under pressure and/or at elevated temperature with concomitant sudden expansion of such gases. By suitably controlling the direction of application of such reaction force, the latter may be selectively caused to function primarily in a pusher propulsion capacity or in an anti-torque capacity, or as a combination of pusher propulsion means and anti-torque means.

The invention accordingly resides in the combination, construction, arrangement and relationship of parts illustrated on the accompanying sheets of drawing and described in the following specification.

On the said sheets of drawing:

Fig. 1 is a side elevation, with parts in section, of a helicopter construction according to the present invention;

Fig. 2 is a top plan view, on a somewhat reduced scale and with parts in section, of the embodiment of Fig. 1;

Fig. 3 is a side view, partly in elevation and partly in section and with parts broken away, showing the engine of the craft and its relation to the compressor according to the invention;

Fig. 4 is a top view corresponding to Fig. 3, with some parts in plan and others in section;

Fig. 5 is a side elevation of a helicopter construction with a modified relationship of parts according to the invention.

Fig. 6 is a top plan view of the embodiment of Fig. 5, an alternative position of the Venturi-tube outlet being shown in broken lines; and Fig. 7 is a view of a detail according to the invention, alternative positions of the Venturi-tube outlet being shown in broken lines.

Like reference characters identify like parts throughout the several figures of drawing.

In the first form of the invention (Figs. 1-4 of the drawings), the long rotary blades 10 which rotate above the craft are of the conventional helicopter air-foil type. These blades constitute the lifting and/or soaring means whereby ascending and descending movements may be imparted to the craft or the latter maintained in soaring position in the air. The pitch of the air-screw 10 may be adjusted in conventional manner with the aid of known means for this purpose.

Blades 10 are driven from a multi-cylinder engine 11 of the internal combustion type through the medium of a conventional power transmitting system, shown diagrammatically at 12.

Engine 11 also constitutes the source of motive power for gas or air compressor 13, power transmission from the former being effected through the medium of gearing 14 or the like, driven from the motor 11 in known manner and preferably housed in casing 15.

Means, not shown, may preferably be provided for varying the ratio of power transmission from engine 11 to transmission means 14, so that compressor 13 may be operated at varying speeds relative to the air-screw 10.

Exhaust gases from the engine 11 are discharged through conduits 16 into the intake side of compressor 13, which per se is of essentially conventional gas or air compressor construction, being discharged from the latter on the discharge side through outlet conduits 17 (Figs. 3 and 4).

Conduit 17 terminates at its tail end in the expansion tube-channel 18 arranged at right-angles to the conduit 17 and in a direction such that reaction force due to the expulsion of the compressed exhaust gas or air therefrom tends to neutralize centrifugal torque, i. e., tendency to spin, due to the rotation of blades 10.

The interior of member 18 is Venturi-shaped in character, as shown, with the maximum cross-sectional area of the passageway therethrough being at its outer end and with the minimum cross-sectional area intermediate the ends thereof, whereby a nozzle effect is achieved, the reaction to which establishes the desired torque-counteracting force. The magnitude of the last-mentioned force may be controlled by controlling the speed of compressor 13. An alternative method of controlling the magnitude of this force is by varying the direction of the Venturi tube 18 according to the modification hereinafter described.

A supplemental source of gas to be supplied to the compressor 13 is the atmosphere, air being taken in from the exterior at the upper inlet end of air conduit 19. This inlet end may advantageously be provided with a screen for filtering out undesired foreign particles, and a cover flap may also be provided. Suitable conventional means for raising and lowering the said flap may be provided. If desired, such means may be associated and/or correlated with means 21 whereby the aircraft operator may control valve means 22 positioned in conduit 19, as shown.

Conduit 19 terminates at its lower end in the casing of engine 11 (see Figs. 3 and 4), the air from the latter being exhausted into compressor 13 through conduit 23. During its passage through the engine casing and about the several cylinders which are preferably provided with the usual cooling fins, heat interchange takes place whereby the engine is cooled and the air, on its way to the compressor, is correspondingly heated.

Referring now to the embodiment shown in Figs. 5, 6 and 7, this differs from the first-described embodiment only in the adjustability of the mounting of the Venturi tube 18'. As shown more particularly in Fig. 7, tube 18' is mounted by its socket end 24 on the enlarged ball end 25 of conduit 17, the parts being retained for pivotal movement by pintle 26 or the like. Means, which may take the form of a wire-and-pulley system or any other suitable device, may be provided to enable the aircraft operator to move the tube 18' between its one extreme position at right angles to conduit 17, as shown in full lines in Fig. 6, and its other extreme position wherein it constitutes a longitudinal extension of conduit 17. Tube 18' may also assume intermediate positions, one such position being shown in Fig. 7 intermediate the two aforementioned extreme positions.

In its first extreme position, tube 18' is in effect a duplicate—as to structure as well as to function—of previously described Venturi tube 18. In its intermediate positions, tube 18' functions—upon the expulsion of gas therethrough—to exert anti-torque action and also a modicum of pusher repelling action, the reactive force being resolvable into a component acting directly opposite to the centrifugal torque produced by the rotation of the air-screw and a component acting in the direction of the longitudinal axis of the fuselage of the craft. The magnitude of these component forces may be varied by varying the compressor action.

In the other extreme position of the tube 18', the reactive force acts exclusively in the direction of the said longitudinal axis and thus has a wholly pusher propelling action.

At the start of a flight, it is desirable that a relative maximum proportion of power be applied to the air-screw. At this time, therefore, the centrifugal torque action of the latter will be at a maximum, and the Venturi or reaction tube 18' should be in its first extreme position—perpendicular to conduit 17—whereby maximum torque-neutralizing action may be produced thereby.

After the desired height has been attained, only sufficient power need be transmitted to the blades 10 to sustain the craft in air. At this time, it is desirable to move Venturi tube 18' to a position wherein, in addition to exerting the necessary anti-torque action, it will act to assist in propelling the craft through the air.

Minor changes may, of course, be made in the aforedescribed relationships of parts. Thus, specifically different mounting means may be provided, for example, for tube 18'. Similarly, instead of a two-bladed lifting propeller, use may be made of a single-bladed propeller and a counter-balance therefor.

It will be manifest from the foregoing that the present invention provides novel relationships of parts whereby the intended objects of the invention may be realized.

Having thus described the invention, what is claimed is:

A helicopter comprising a fuselage having a tail, a lifting propeller, an internal combustion engine as a source of motive power, means for transmitting power from said source to said propeller, a gas compressor having an outlet for compressed gas, means for transmitting power from said source of motive power to said compressor, means for supplying exhaust gases from said engine to said compressor, means for supplying preheated air to said compressor, a single elongated conduit of small diameter relative to the diameter of said fuselage extending from said outlet and terminating in an expansion tube-channel in the tail of said fuselage, the said expansion tube-channel having its maximum cross-sectional area at its outlet end and its minimum cross-sectional area intermediate the ends thereof, and means for pivotally mounting the said expansion tube-channel adjacent its inner end on the terminal end of said conduit, whereby the expulsion of the compressed gas under pressure from said expansion tube-channel establishes a reaction force adapted to act as pusher propulsion means and as anti-torque means, depending on the direction of expulsion relative to said fuselage.

ANTOINE GAZDA.

REFERENCES CITED

The following references are of record in the file of this patent:

UNITED STATES PATENTS

| Number | Name | Date |
| --- | --- | --- |
| 1,454,828 | Bell | May 8, 1923 |
| 1,897,092 | Weir | Feb. 14, 1933 |
| 1,971,734 | Stalker | Aug. 28, 1934 |
| 2,193,375 | Papritz | Mar. 12, 1940 |
| 2,369,652 | Avery | Feb. 20, 1945 |
| 2,393,899 | Gregory | Jan. 29, 1946 |

FOREIGN PATENTS

| Number | Country | Date |
| --- | --- | --- |
| 403,730 | France | Oct. 2, 1909 |
| 687,482 | France | Apr. 28, 1930 |
| 818,703 | France | June 21, 1937 |